US006289866B1

(12) United States Patent
Tsuruta et al.

(10) Patent No.: US 6,289,866 B1
(45) Date of Patent: Sep. 18, 2001

(54) STRUCTURE OF AN INTAKE PIPE COVER

(75) Inventors: Yuichiro Tsuruta; Masahiro Inoue; Shinji Takahashi; Masao Takeshima; Shinichi Karube, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/654,255

(22) Filed: Sep. 1, 2000

(30) Foreign Application Priority Data

Sep. 3, 1999 (JP) ........................................ 11-250824

(51) Int. Cl.[7] ........................................ B62M 7/02
(52) U.S. Cl. ........................................ 123/198 E
(58) Field of Search ........................................ 123/198 E

(56) References Cited

U.S. PATENT DOCUMENTS 1,434,562 * 11/1922 Quam ........................ 123/198 E
4,366,878 * 1/1983 Warf ........................ 180/54 A
4,434,755 * 3/1984 Kazuta et al. ........................ 123/198 E
5,918,576 * 7/1999 Ohoka et al. ........................ 123/198 E
6,092,498 * 7/2000 Lohr et al. ........................ 123/198 E

FOREIGN PATENT DOCUMENTS 3-109194 A 5/1991 (JP) .

* cited by examiner

*Primary Examiner*—Marguerite McMahon

(57) ABSTRACT

A snorkel duct passes a side of a lower portion of a fuel tank to extend to a front side thereof and an inlet at a front end of the snorkel duct is connected to an intake cover disposed in the area of the front side of the fuel tank. The intake pipe cover is a box shape member substantially in an L-like shape, integrally provided with a side chamber deviated to the left side of a vehicle body and a rear chamber extended therefrom to the center of the vehicle body. An intake port of the intake pipe cover is opened rearwardly from a front end side of an extended portion of the rear chamber. The rear chamber faces a space on a lower side of a stepped portion constituted at a front portion of a bottom portion of the fuel tank and sucks outside air from an optimum position having negligible water, dust or the like content.

6 Claims, 8 Drawing Sheets

STRUCTURE OF AN INTAKE PIPE COVER

BACKGROUND OF THE INVENTION

1. Field of the Invention

The present invention relates to a structure of an intake pipe cover, and in particular to a structure of an intake pipe cover used on off-road type vehicles, such as all terrain vehicles (ATVs).

2. Background Art

An intake pipe of an ATV is liable to intake water, mud, snow, dust or the like (hereinafter, referred to as water, dust or the like) and accordingly, an inlet of the intake pipe is covered by an intake pipe cover. For example, there is disclosed in Japanese Patent Laid-Open No. 109194/1991, a structure in which an intake pipe cover in a box-like shape opened in an upward direction is provided on a lower side of a front cover. An inlet of an intake pipe is made to face an upper opening portion thereof and the upper opening portion of the intake pipe cover is covered by a front fender.

According to the above-described conventional example, the front cover which is an example of a functional part of a vehicle body is utilized as a portion of the intake pipe cover. Therefore, a reduction in a number of parts can be achieved. However, since the functional part of the vehicle body is utilized, in order to open an intake port of the intake pipe cover to a location at which water, dust or the like will unlikely enter the intake, a seal structure is required. This requirement of a seal significantly restricts the design layout of the intake pipe and the inlet.

SUMMARY OF THE INVENTION

In order to resolve the above-described deficiencies of the conventional art, according to a first aspect of the present invention, there is provided a structure of an intake pipe cover having an intake pipe cover for covering an immediate surrounding of an inlet of an intake pipe for introducing outside air into an air cleaner. The intake pipe cover includes a box shape member independent from functional parts of a vehicle body.

According to a second aspect of the present invention, there is provided the structure of an intake pipe cover according to the first aspect, where the inlet of the intake pipe is connected to a portion of the intake pipe cover, and an intake port of the intake pipe cover is opened at a position which is not opposed to the inlet.

According to a third aspect of the present invention, there is provided the structure of an intake pipe cover according to the second aspect, where the intake pipe cover is formed substantially in an L-like shape, the inlet of the intake pipe is connected to one chamber which is bent, and the intake port is opened to another chamber.

According to a fourth aspect of the present invention, there is provided the structure of an intake cover according to the first aspect, characterized in that a front end of a breather tube is connected to the intake pipe cover.

According to the first aspect of the present invention, the intake pipe cover is constituted by the box shape member independent from the functional parts of the vehicle body. Accordingly, no special seal is required between the intake pipe cover and the functional parts of the vehicle body. Furthermore, an opening position can arbitrarily be set to the configuration of the box shape member and the intake port to thereby constitute an optimum position at which invasion of water, dust or the like is most liable to be prevented. Accordingly, the layout of the intake pipe and the inlet is not restricted and the degree of design freedom can be enhanced.

According to the second aspect of the present invention, the inlet of the intake pipe connected to the intake pipe cover and the intake port of the intake pipe cover are not opposed to each other and therefore, there is no interference of intake. This results in uninhibited intake of air.

According to the third aspect of the present invention, when the intake pipe cover is formed substantially in the L-like shape, an arrangement in which the inlet of the intake pipe and the intake port of the intake pipe cover are not opposed to each other can easily be realized.

According to the fourth aspect of the present invention, when the front end of the breather tube is connected to the intake pipe cover, the breather tube can easily be connected in a manner with avoids the intake of water, dust or the like.

Further scope of applicability of the present invention will become apparent from the detailed description given hereinafter. However, it should be understood that the detailed description and specific examples, while indicating preferred embodiments of the invention are given by way of illustration only, since various changes and modifications within the sprit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not imitative of the present invention, and wherein.

DETAILED DESCRIPTION OF THE PREFERRED EMBODIMENTS

Figure 1:
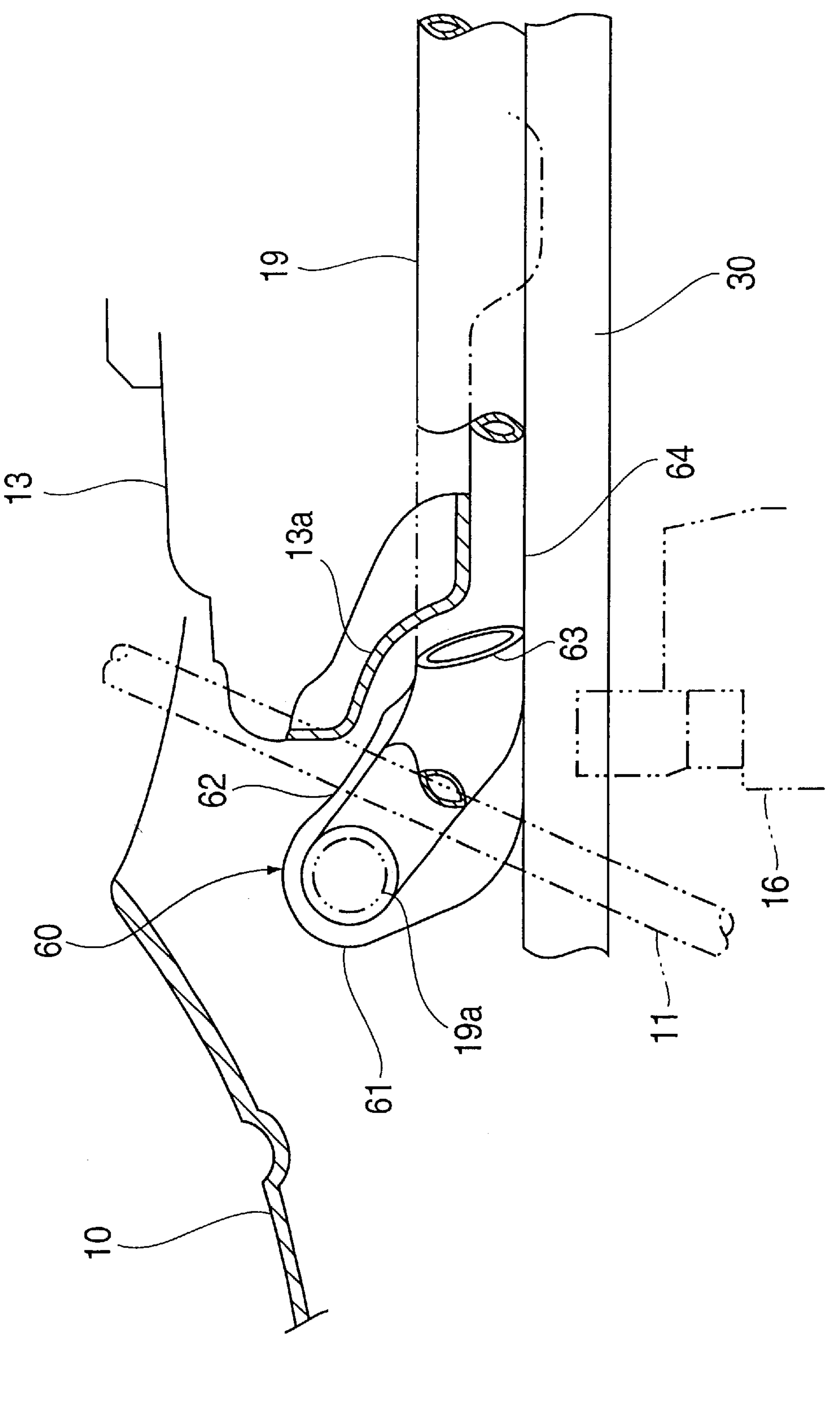
FIG. 1 is a side view of a snorkel duct and an intake pipe cover according to an embodiment of the present invention.

The present invention will hereinafter be described with reference to an embodiment shown in the drawings. The drawings refer to a four wheel vehicle, however the use of such a vehicle type is for illustrative purposes only, and should not be construed as limiting of the present invention. The present invention may be employed on various vehicle types.

Figure 2:
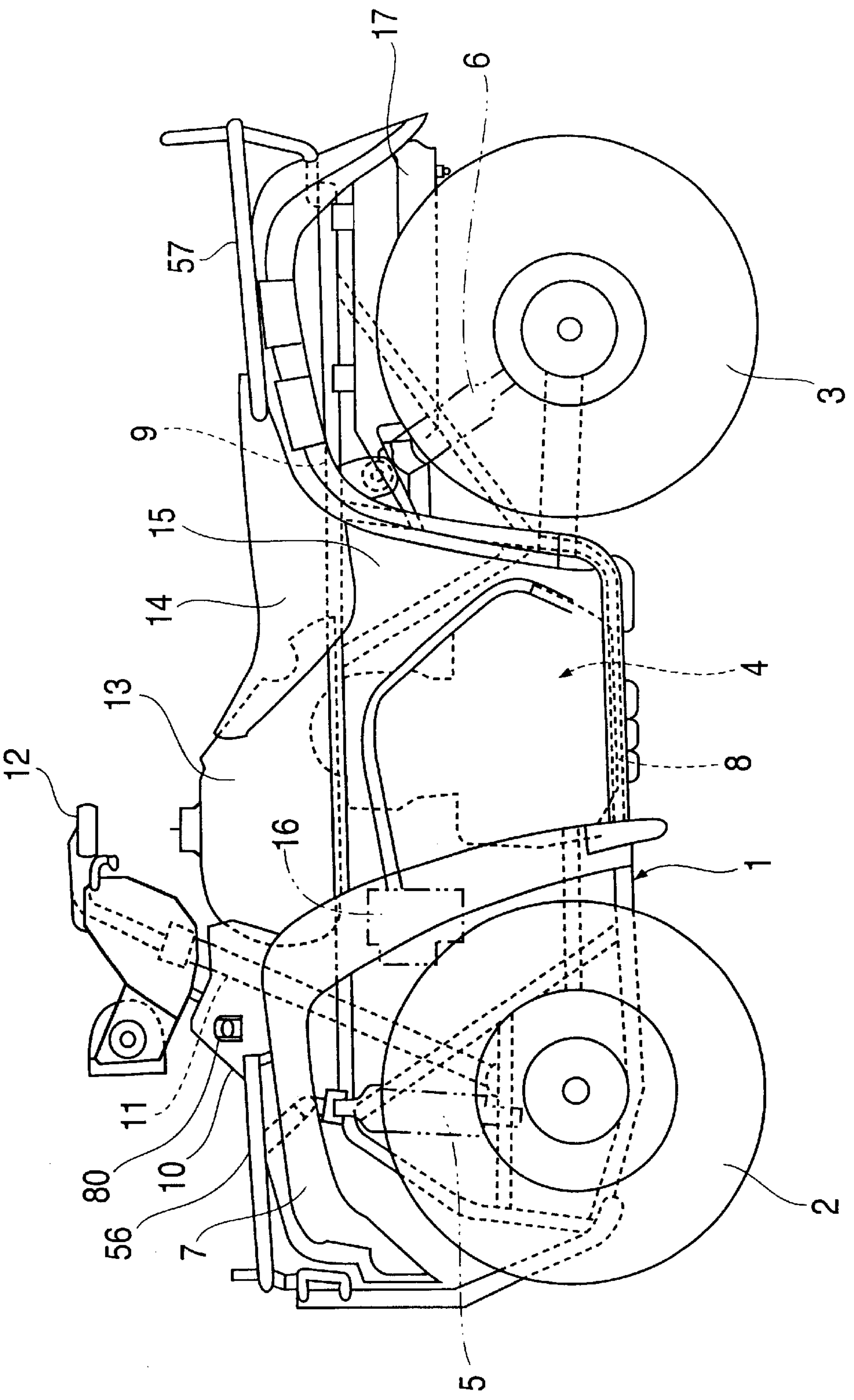
FIG. 2 is a side view of a four wheel vehicle.
Figure 3:
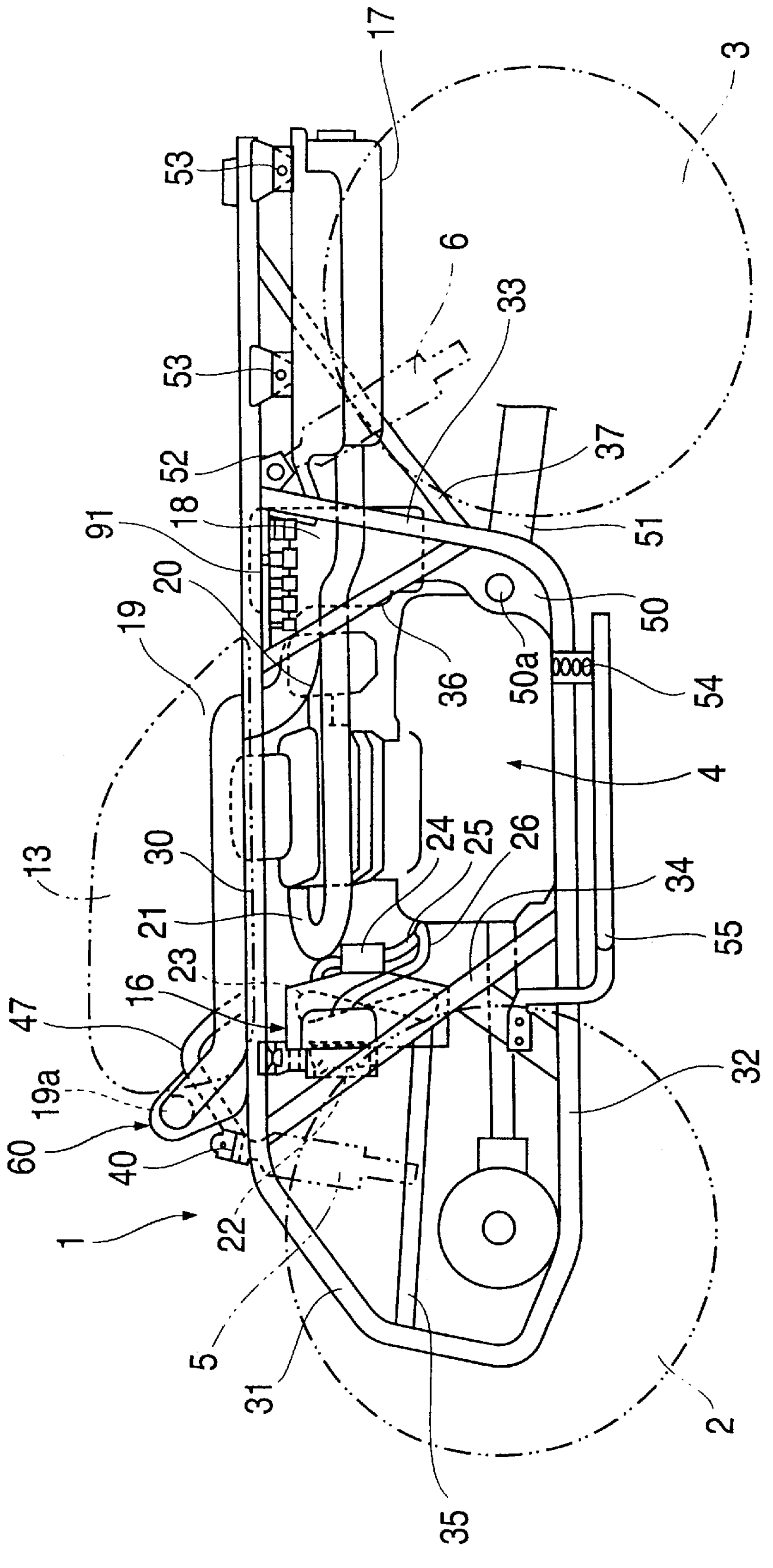
FIG. 3 is a side view of specific portions of the four wheel vehicle body.

FIG. 2 is a side view of a four wheel vehicle and FIG. 3 is a side view of specific portions of the four wheel vehicle body.

According to the buggy vehicle, pairs of front wheels 2 and rear wheels 3 comprising low pressure balloon tires are supported respectively on a left and right sides of a front and a rear portion of a vehicle body frame 1. The body frame 1 is driven by a power unit 4 mounted at a central portion of the vehicle body frame 1. The body frame 1 also includes a front cushion 5 and a rear cushion 6.

Reference numeral 7 in FIG. 2 designates a front fender, 8 designates a sub fender, and 9 designates a rear fender. Furthermore, 10 designates a front panel, 11 designates a steering shaft, 12 designates a handlebar, 13 designates a fuel tank, 14 designates a saddle riding type seat, 15 designates a rear panel, 16 designates a cooling unit and 17 designates a muffler. Additionally, reference numeral 18 in FIG. 3 designates an air cleaner, 19 designates a snorkel duct and 20 designates a carburetor.

Next, an explanation will be given of structure of the vehicle body frame 1. As shown by FIG. 3, the vehicle frame 1 is provided with respective left and right pairs of upper pipes 30 extended in a front and rear direction substantially in parallel with each other and in a linear shape. The vehicle frame 1 is also provided with front pipes 31 being extended in an up and down direction from front end portions thereof, lower pipes 32 being extended in a rear direction from lower end portions thereof and center pipes 33 extended in an upper direction from rear end portions thereof and connected to positions shifted rearward from middle portions of the upper pipe 30.

Furthermore, the vehicle body frame 1 is provided with respective left and right pairs of reinforcement pipes 34 connected from front end portions of the upper pipe 30 to front half side portions of the lower pipes 32 in an oblique direction. Middle pipes 35 are connected to respective middle portions of the reinforcement pipes 34 and the front pipes 31 in the front and rear direction. The vehicle body frame also includes reinforcement pipes 36 and 37 which are connected to middle portions of the center pipes 33, and a plurality of cross members starting from a front cushion bracket 40 and the like are respectively made to span these left and right members of the vehicle body frame 1. Each of the described members constitute the vehicle body frame 1 and are connected and integrated together to form the vehicle illustrated in the figures.

Additionally, a left and right pair of head portion pipes 47 formed in a shape of a mountain in side view is provided at front ends of the upper pipe 30. A stay (not illustrated) is provided at top portions of the head portion pipes 47. An upper portion of the steering shaft 11 (FIG. 2) is rotatably supported via the stay. A lower end portion of the steering shaft 11 is axially supported by a bearing portion provided at the middle pipes 35.

Furthermore, at both left and right ends of the front cushion bracket 40 connecting the front ends of the left and right upper pipe 30, an upper end portion of the front cushion 5 is supported and a lower end portion of the front cushion 5 is supported by upper arms constituting a front wheel suspension of a double wishbone type (not illustrated). The upper arms are pivotably supported by the middle pipe 35 and lower arms paired therewith are pivotably supported at front end portions of the lower pipes 32.

Pivot plates 50 are provided at comer portions of lower portions of the center pipes 33 and rear ends of the lower pipes 32 and front end portions of rear swing arms 51 are pivotably supported thereby. The rear swing arm 51 contains a drive shaft constituting a rear wheel drive mechanism. The upper pipes 30 are extended further rearward from portions thereof and are connected with the center pipes 33 An upper end portion of the rear cushion 6 is supported by stays 52, and the muffler 17 is supported by another stay 53.

An exhaust pipe 21, a rear end portion of which is connected to the muffler 17, is extended in the front direction substantially in a linear shape and a front end portion thereof is bent substantially in a U-like shape and is connected to an exhaust port provided at a cylinder head of the power unit 4. Furthermore, the cooling unit 16 is hung from and supported by the upper pipes 30 on a front side of the power unit 4. The cooling unit 16 is integrated with an oil cooler 22 and a cooling fan 23. Reference numeral 24 designates a motor thereof, and reference numerals 25 and 26 designate hoses connected to the power unit 4.

Furthermore, steps 54 extended to outer sides are provided at portions of the left and right lower pipes 32 for mounting the power unit 4. The steps 54 are protruded from the lower pipes 32 in outer side directions, step frames 55 are bent to connect front ends thereof and the lower pipes 32 and the sub fender 8 is mounted on and attached to these members.

Figure 4:
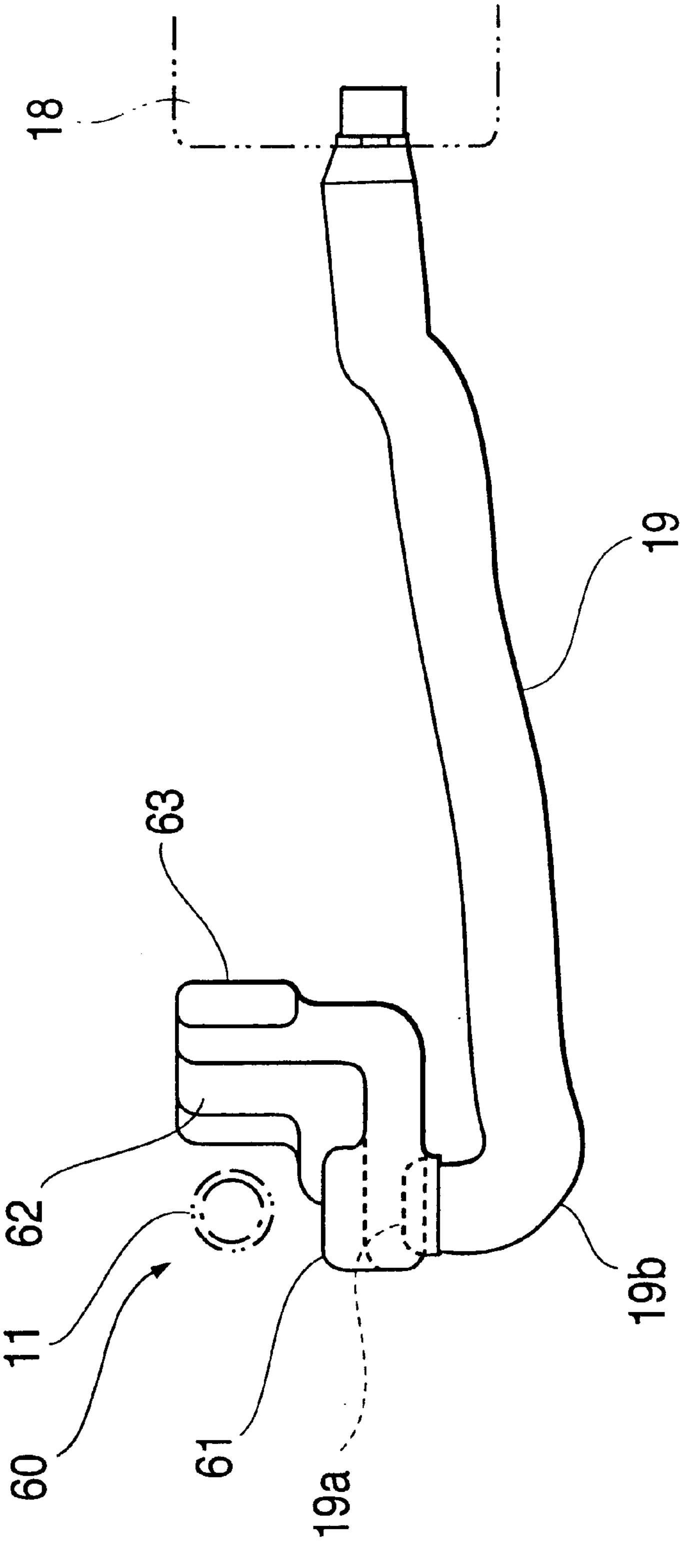
FIG. 4 is a plan view of the snorkel duct and the intake pipe cover according to an embodiment of the present invention.
Figure 5:
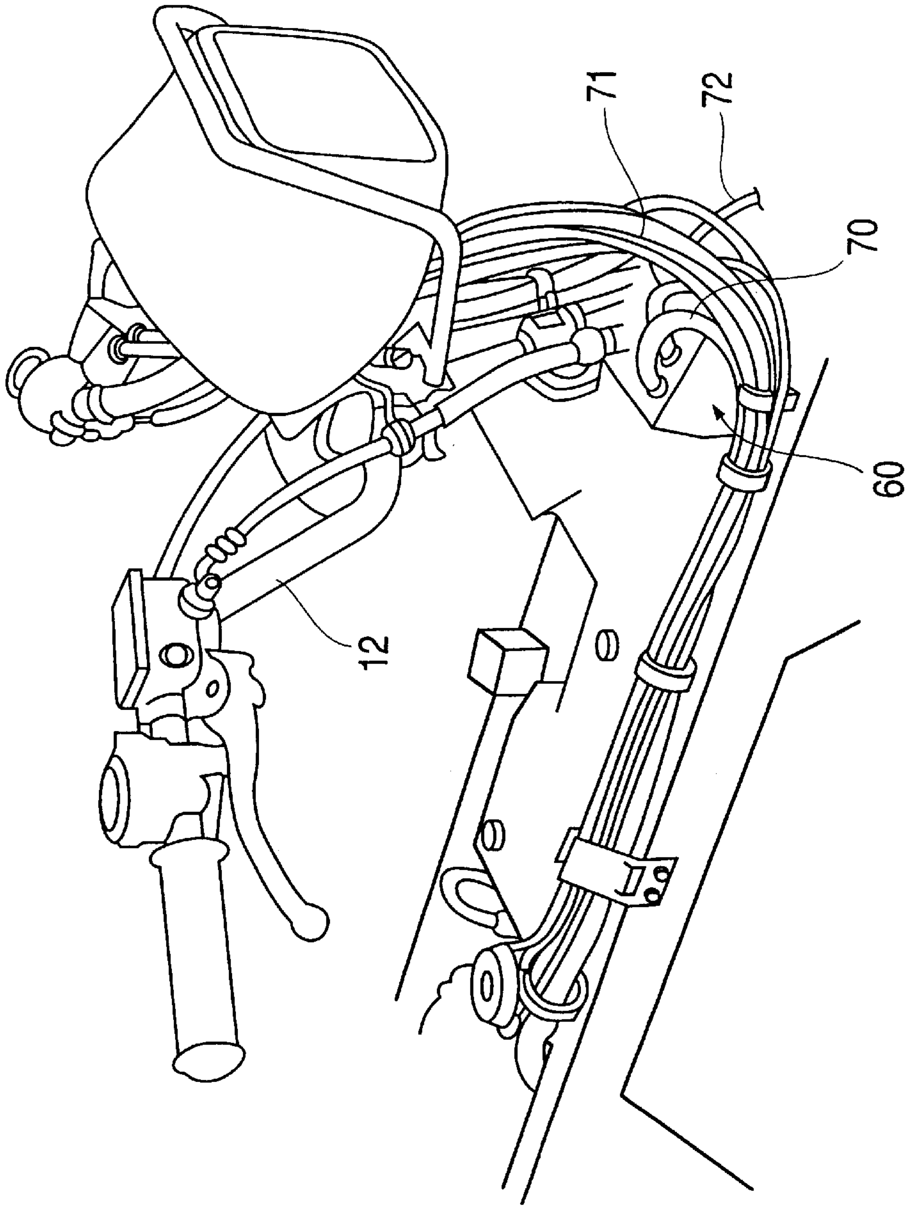
FIG. 5 is a perspective view of specific portions of a front portion of the four wheel vehicle body illustrating piping of breather tubes.

Next, an explanation will be given of the snorkel duct 19 which includes an intake pipe and an intake cover. FIG. 1 is a side view of the snorkel duct 19 and an intake pipe cover 60, which are in a connected state. FIG. 4 is a plan view of the snorkel duct 19 and the intake pipe cover 60 and FIG. 5 is a perspective view of a front portion of the vehicle body showing piping of a breather tube.

As shown by FIG. 1, the snorkel duct 19 is extended forward from the air cleaner 18 and passes from a side of a lower portion of the fuel tank 13 along an upper face of the upper pipe 30. A front end thereof is raised in an oblique upward direction on a front side of the fuel tank 13 and an inlet 19*a* opened at the front end is connected to an upper portion of a side face of the intake pipe cover 60 supported on the upper pipe 30.

The intake pipe cover 60 is a box shape member molded in a hollow shape constituting substantially an L-like shape by pertinently using synthetic resin and is continuously and integrally formed with a side chamber 61 to which the inlet 19*a* of the snorkel duct 19 is connected. The intake pipe cover 60 is further constituted by a rear chamber 62 which intersects substantially orthogonally with the side chamber 61. Moreover, the intake pipe cover further includes an intake port 63, which is opened in a rear direction at a rear portion of the rear chamber 62.

The rear chamber 62 is extended from the left side of the vehicle body toward center of the vehicle body, the intake pipe 63 is provided at the central portion of the vehicle body on the side of a front end of the extended portion and enters a space 64 on a lower side of a stepped portion 13*a* formed at center of a front portion of the fuel tank 13.

The cooling unit 16 hung from and supported by the upper pipes 30 is disposed on the lower side of the intake pipe cover 60. Therefore, an upper side, left and right sides and a rear side of the space 64 are surrounded by a bottom portion of the fuel tank 13 and a lower side thereof is covered by the cooling unit 16 to thereby constitute a space in which water, dust or the like is essentially inhibited from entering.

Furthermore, the front panel 10 is disposed on the upper side of the intake pipe cover 60. That is, the intake pipe cover 60 is disposed in a space surrounded by the front panel 10, the fuel tank 13, the left and right upper pipes 30 and the cooling unit 16 and is disposed independently from the front panel 10, which is a functional part of the vehicle body.

The intake pipe cover 60 is formed substantially in a triangular shape in side view, a top portion thereof is disposed at the side chamber 61 which is connected with the inlet 19*a* and the intake port 63 is opened at a position in correspondence with a rear end portion of the base. Therefore, the inlet 19*a* is disposed at a position higher than the intake port 63. Further, as shown in FIG. 4, a space formed by the vehicle body right side of the side chamber 61 and the front side of the rear chamber 62 constitute a space for passing the steering shaft 11.

The inlet 19*a* of the snorkel duct 19 is opened at a front end of a bent portion 19*b* bent to a side direction of the vehicle body. A length from the inlet 19*a* to an inlet of the air cleaner 18 is an effective pipe length of the snorkel duct 19 as a pipeline portion having a substantially constant sectional area. The functionality of the snorkel duct 19 as the intake pipe is determined by the length and sectional area thereof.

Therefore, although the intake pipe cover 60 is connected to the inlet 19*a*, the intake pipe cover 60 having a significantly different sectional area does not assume the functionality of the intake pipe, but instead functions as a simple cover surrounding the inlet 19*a*. Incidentally, for this reason, shape or capacity of the intake pipe cover 60 can freely be changed without influencing on the function of the snorkel duct 19.

Furthermore, the intake pipe cover 60 functions also as a member for containing front ends of breather tubes. That is, as shown by FIG. 5, the intake pipe cover 60 is inserted with front ends of various breather tubes such as a breather tube 70 for a cooling fan motor, a breather tube 71 for rear brake, a breather tube 72 for front brake, a breather tube for a front gear case, a breather tube for a rear gear case and so on which communicate with inside of the intake pipe cover 60 and are opened to an optimum space which is not exposed to water, dust or the like, i.e. the inside of the intake pipe cover 60.

Figure 6:
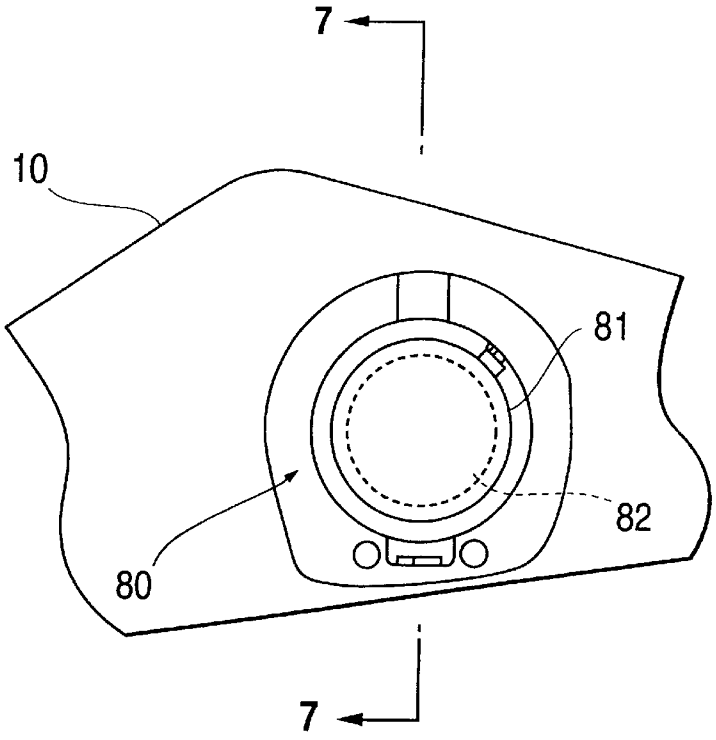
FIG. 6 is a perspective view of an accessory socket disposed on the four wheel vehicle body.
Figure 7:
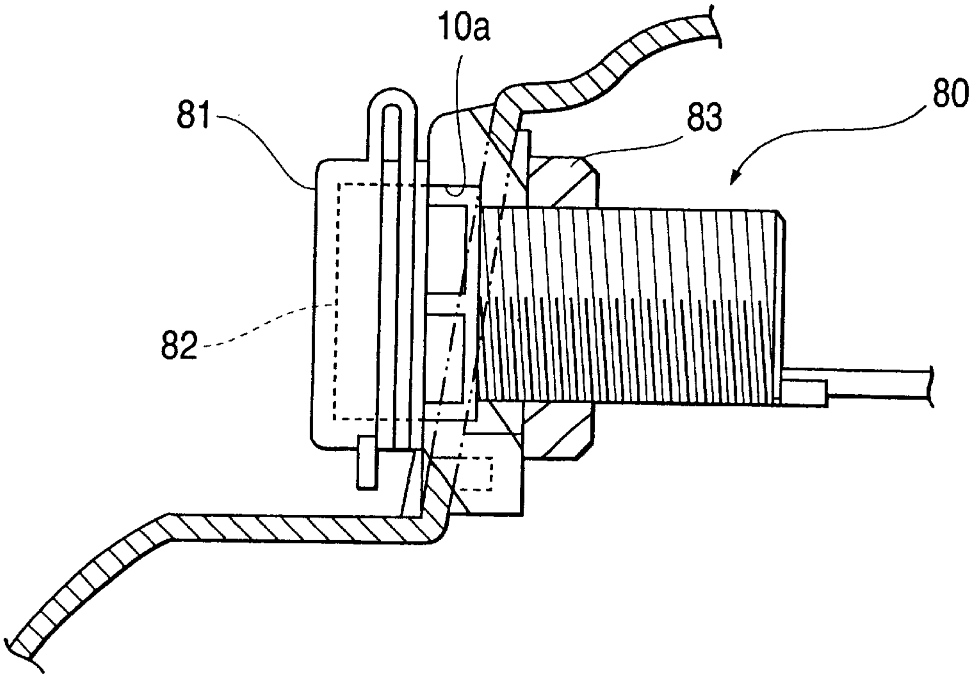
FIG. 7 is a cross sectional view taken along line 7—7 of FIG. 6.

Additionally, an accessory socket 80 is attached to a side face of the front panel 10. FIG. 6 is an enlarged side view of the front panel 10, FIG. 7 is a cross-sectional view taken along a line 7—7 of FIG. 6. As is illustrated in the figures the accessory socket 80 is fixed to the front panel 10 by a nut 83 in a state in which a connector portion 82 covered with a cap 81 is fitted to an opening portion 10*a* provided at the side face of the front panel 10 to face outwardly.

Figure 8:
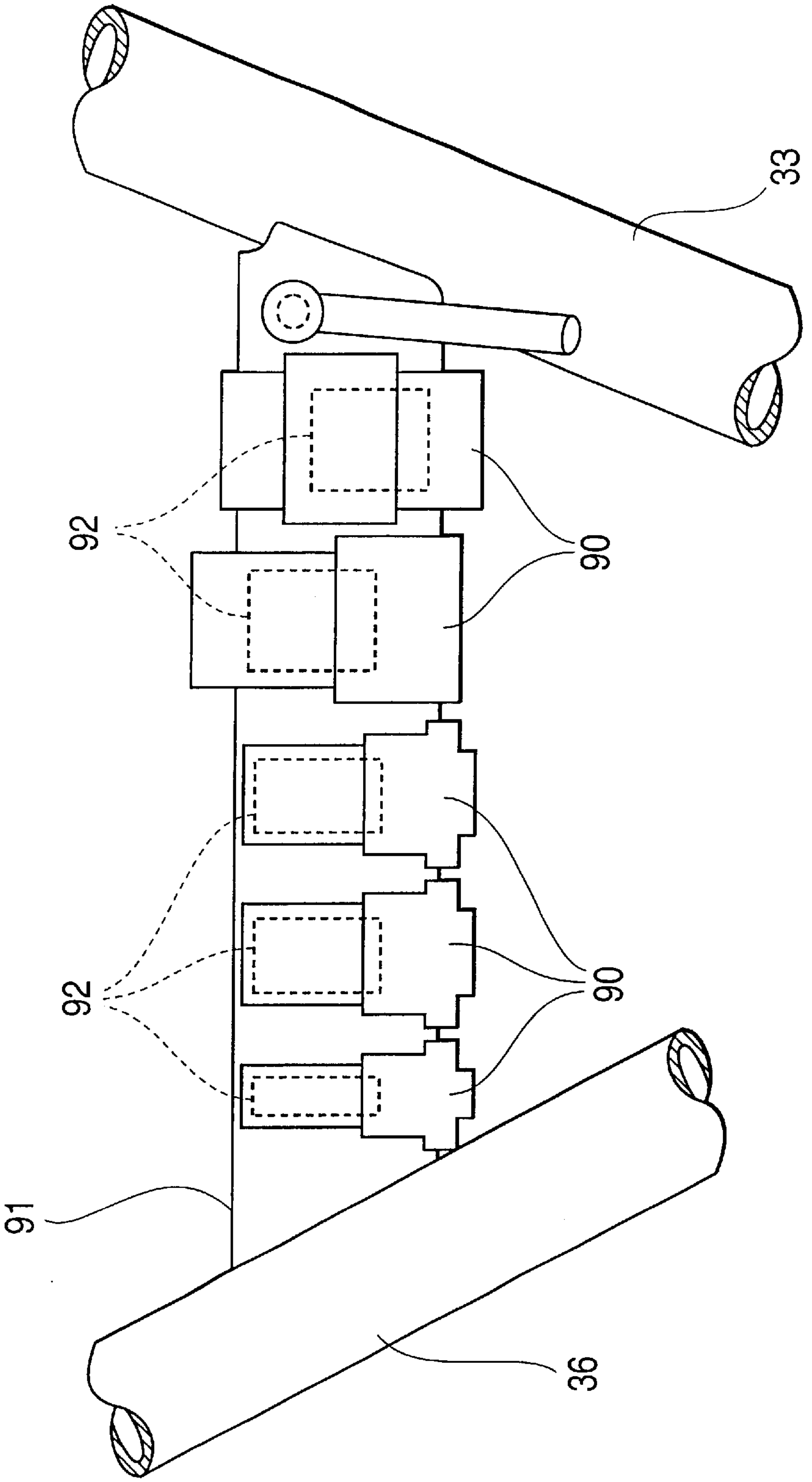
FIG. 8 illustrates a concentrated arrangement of couplers on a front portion of the four wheel vehicle.

Furthermore, as shown by FIG. 8, couplers 90 of various kinds of electric equipment are concentratedly attached to a front face of the front cushion bracket 40 which is the front portion of the vehicle body. FIG. 8 illustrates the front cushion bracket 40 from the front side. As is seen in the figure, a front wall 40*a* of the front cushion bracket 40 is formed with claws 40*b* in an L-like shape integrally cut to rise by pressing to project upwardly and rear faces of the respective couplers 90 are locked thereto.

Figure 9:
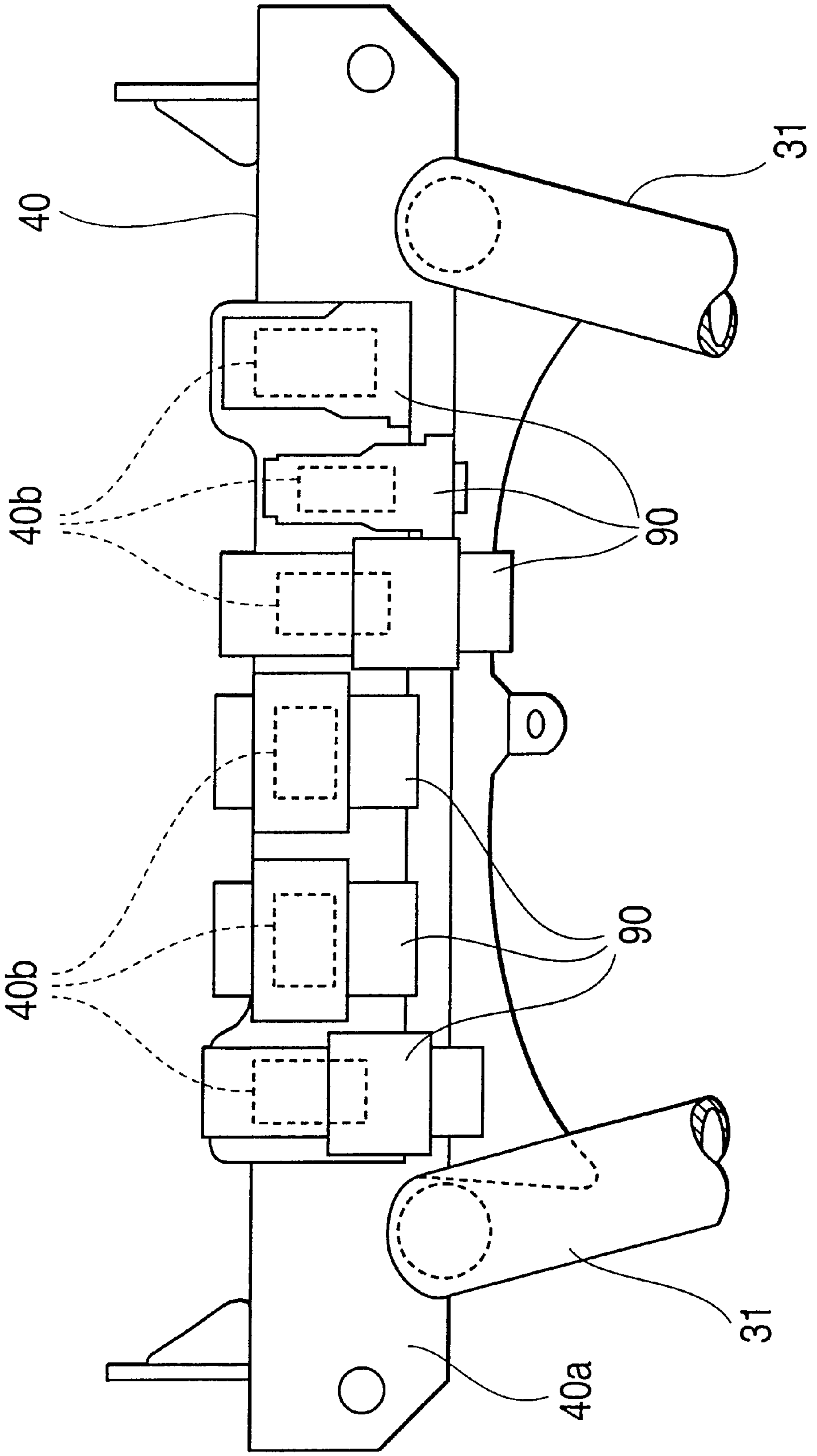
FIG. 9 illustrates a concentrated arrangement of coupler on a rear portion of the four wheel vehicle.

Additionally, a similar structure of attaching the couplers 90 is provided at the rear portion of the vehicle body. As is illustrated in FIG. 9, a concentrated attachment board 91 connecting the reinforcement pipe 36 and the center pipe 33 is provided on the lower side of the upper pipe 30 in parallel therewith, claws 92 are formed similar to the claws 40*b* and the couplers 90 are locked to the claws 92.

Next, an explanation will be given of operation of an embodiment according to the present invention. As illustrated in FIG. 1 and FIG. 4, the inlet 19*a* of the snorkel duct 19 is connected to the intake pipe cover 60 which is a box shape member formed independent from a functional part of the vehicle body. Accordingly, there is no restriction from the functional part of the vehicle body, no particular seal structure is required for the intake pipe cover 60 and there is no restriction with regard to the shape and the opening position of the intake port 63.

Therefore,the intake port 63 can be opened to an optimum position at which invasion of water, dust or the like is the least likely to occure. This is achieved by forming the intake pipe cover 60 in an arbitrary shape, in comparison with the conventional example in which the functional part of the vehicle body serves also as the intake pipe cover, although a number of parts is increased by providing the intake pipe cover 60, the number of parts as a whole can be reduced since an incidental structure such as a seal or the like is eliminated and the above-described respective restrictions can be resolved and the degree of freedom in view of layout is enhanced.

Furthermore, according to the snorkel duct 19, the effective length can be determined as an intermediary between the inlet 19*a* and the air cleaner 18 regardless of shape or the like of the intake pipe cover 60 and accordingly, the snorkel duct 19 per se is provided with necessary pipe length and sectional area regardless of the position of the intake port 63 and can be formed in a shape which is easy to arrange. Therefore, the restriction of the snorkel duct 19 in view of layout is reduced and the degree of freedom of design is enhanced.

Moreover, the intake pipe cover 60 is formed substantially in an L-like shape. The inlet 19*a* is connected to the side chamber 61, and the intake port 63 which is opened in the direction different substantially by 90 degrees is provided at the rear chamber 62. Accordingly, the inlet 19*a* and the intake port 63 are not opposed to each other and there can be constituted smooth intake without intake interference.

Additionally, the intake port 63 is opened in the rear direction at the central portion of the vehicle body and faces the space 64 surrounded by the stepped portion 13*a* of the fuel tank 13. Therefore, the intake port 63 can intake outside air from the optimum space at which water, mud, dust, snow or the like splashed by the front wheel is most difficult to invade.

Furthermore, the cooing unit 16 is provided on the lower side of the space 64. Accordingly, water, dust or the like originating from the front portion of the vehicle body is blown to the rear. Therefore, inside of the space 64 is easy to maintain essentially water, dust or the like free.

Moreover, outside air in the space 64 having such a small amount of water, dust or the like is sucked from the intake port 63 into the intake pipe cover 60 and accordingly, the inside of the intake pipe cover 60 constitutes an environment having very little water, dust or the like content. Therefore, by connecting the breather tubes thereto, the front ends of the various breather tubes can be opened to the clean environment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claim.

What is claimed is:

1. A covering structure for intake system, comprising:

an intake pipe cover for covering an intake end of a snorkel duct; and a breather tube having a front end thereof connected to said intake pipe cover, wherein said intake pipe cover is independently supported by a connection thereof to the intake end of the snorkel duct.

2. The covering structure according to claim 1, wherein said intake pipe cover has a box shape.

3. The covering structure according to claim 1, wherein said intake pipe cover is formed in substantially an L-shape.

4. The covering structure according to claim 3, wherein a first end of the L-shaped receives the intake end of the snorkel duct and a second end of the L-shape shape constitutes an air intake opening of said intake pipe cover.

5. The covering structure according to claim 1, wherein a connecting opening for the intake portion of the snorkel duct and an intake opening of the intake pipe cover are positioned substantially 90° from each other.

6. The covering structure according to claim 1, wherein the intake end of the snorkel duct is connected to a portion of said intake pipe cover, and an intake opening of said intake pipe cover is opened at a position which is not directly opposed to the intake end.

* * * * *